MULTIPLE MATCH RESOLUTION IN ASSOCIATIVE STORAGE SYSTEMS

Filed July 30, 1962 6 Sheets-Sheet 2

MULTIPLE MATCH RESOLUTION IN ASSOCIATIVE STORAGE SYSTEMS

Filed July 30, 1962 6 Sheets-Sheet 3

INVENTOR
EDWIN S. LEE, III
BY Christie, Parker & Hale
ATTORNEYS.

Aug. 20, 1968 E. S. LEE III 3,398,404

MULTIPLE MATCH RESOLUTION IN ASSOCIATIVE STORAGE SYSTEMS

Filed July 30, 1962 6 Sheets-Sheet 4

MULTIPLE MATCH RESOLUTION IN ASSOCIATIVE STORAGE SYSTEMS

Filed July 30, 1962 6 Sheets-Sheet 6

INVENTOR
EDWIN S. LEE, III
BY Christie, Parker & Hale
ATTORNEYS.

United States Patent Office 3,398,404

Patented Aug. 20, 1968

3,398,404

MULTIPLE MATCH RESOLUTION IN ASSOCIATIVE STORAGE SYSTEMS

Edwin S. Lee III, Altadena, Calif., assignor to Burroughs Corporation, Detroit, Mich., a corporation of Michigan Filed July 30, 1962, Ser. No. 213,278
9 Claims. (Cl. 340—172.5)

This invention relates to storage apparatus and more particularly to apparatus for resolving multiple responses in a direct access memory system.

There has been developed a type of memory system for use in digital computers and the like that allows the programmer to have direct access to any word or portion of a word stored in memory rather than requiring the programmer to address a particular word or portion of a word in terms of its actual location in memory. These direct access memories are variously termed as associative, tag, or content address memories. In this type of memory the word identifying portion may be termed a tag, for example, and therefore, the programmer need merely enter the tag into the computer and the computer will simultaneously search all the tags stored in memory to determine the presence or absence of the particular tag in memory. If the searched for tag is present, the electronics associated with the memory will immdeiately read out or write into the storage location identified by the location of the matching tag. One type of associative memory is described in the co-pending application of Robert C. Minnick, entitled, Storage Apparatus, bearing Ser. No. 780,056, filed on Dec. 12, 1958, and assigned to the same assignee as the present application. In this Minnick type of direct access memory the word identifying portion of a piece of information is termed the "tag."

If the same word or tag is stored in a number of locations in memory, it will be evident that since the memory is responsive solely to the tag rather than the physical location of a word that the number of matches correspond to the number of times the particular word is stored in memory. A typical example of the production of multiple responses from a tag comparison cycle results when blank spaces are to be located so that new information may be entered into the memory. In any event, before the computer may complete its operating cycle or produce the required information, it is necessary to resolve the multiple responses due to a comparison cycle.

The problem of resolving multiple matches includes the selection of a pair of valid coordinates from the multiplicity of coordinates signaled as being related to a matching word. An invalid combination of coordinates is possible if more than one location in each coordinate is signaled, in a three dimensional arrangement, for example, multiple X's and Y's are signaled. Specifically, if two matches are signaled and are represented by the coordinates $X_1$, $Y_1$ and $X_2$, $Y_2$, then the memory will indicate that multiple matches are located at locations corresponding to $X_1$, $X_2$, and $Y_1$ and $Y_2$. Out of these four coordinates, then, only a valid combination must be selected. In the assumed pair of matching responses, the invalid combinations that may be selected are $X_1$, $Y_2$ and $X_2$, $Y_1$ and, therefore, the apparatus for effecting a resolution must discriminate between the valid and invalid combinations as well.

This invention provides an improved, simple, and economical apparatus for validly resolving multiple responses produced from a direct access memory. Briefly, an embodiment of the invention comprises a plurality of memory cells for storing binary coded information and arranged in a preselected pattern of information groups. Means is provided for substantially simultaneously applying binary coded input information to each information group for determining the presence and/or location of the input information by the generation of output signals from each memory cell whereby a composite output signal for each information group indicates the presence or absence of the input information by a respective matching or mismatching signal. Control means is coupled to be responsive to a plurality of matching responses for resolving the multiple matches.

These and other features of the present invention may be more fully appreciated when considered in the light of the following specification and drawings, in which:

FIG. 1 is a block showing how FIGS. 1A and 1B are combined;

FIGS. 1A and 1B taken together are a block-schematic diagram of a two dimensional direct access memory embodying the invention;

Figures 3, 3A, 3B:
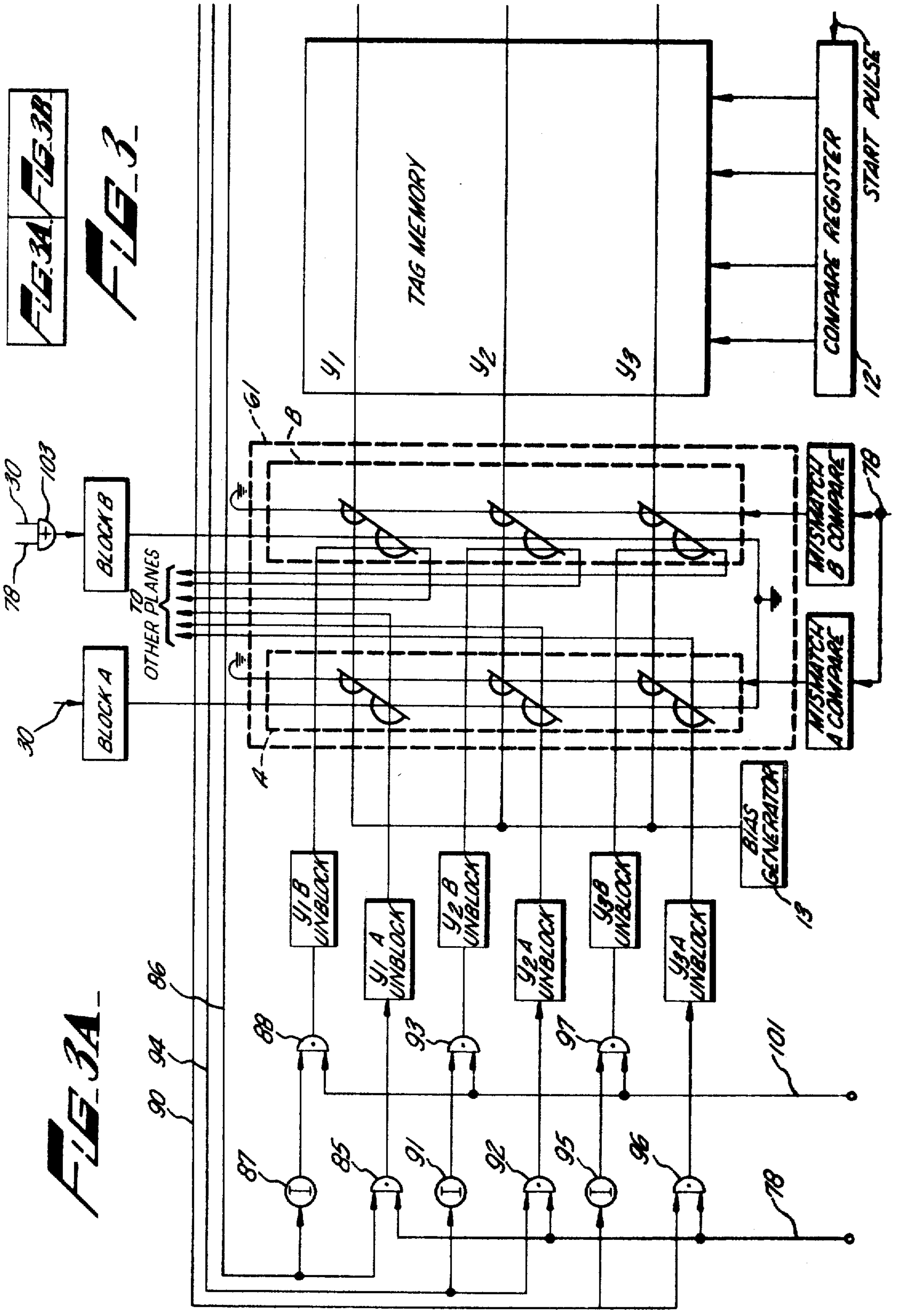
FIG. 3 is a block showing how
FIGS. 3A and 3B are combined.
Figure 3B:
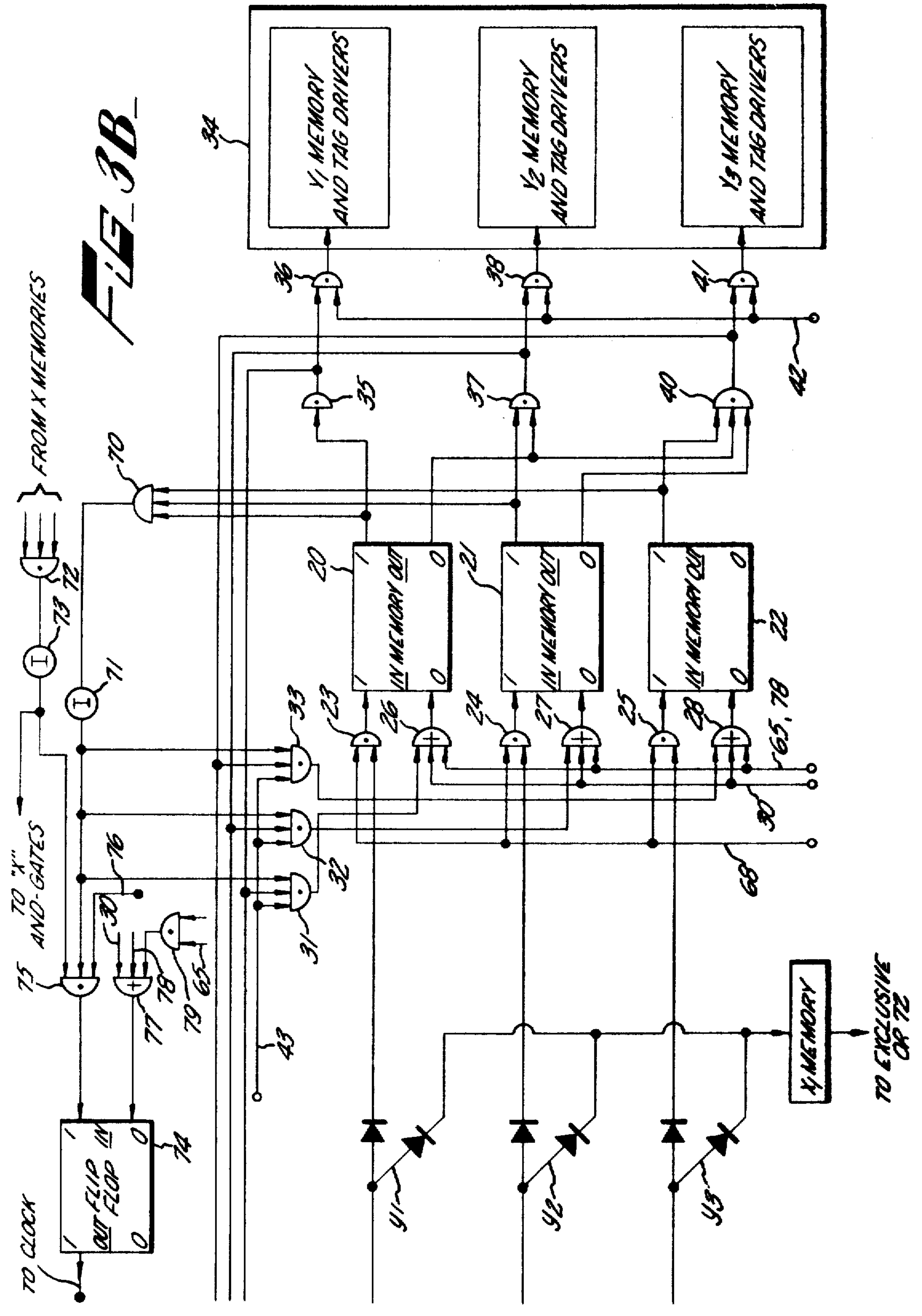
Figure 4:
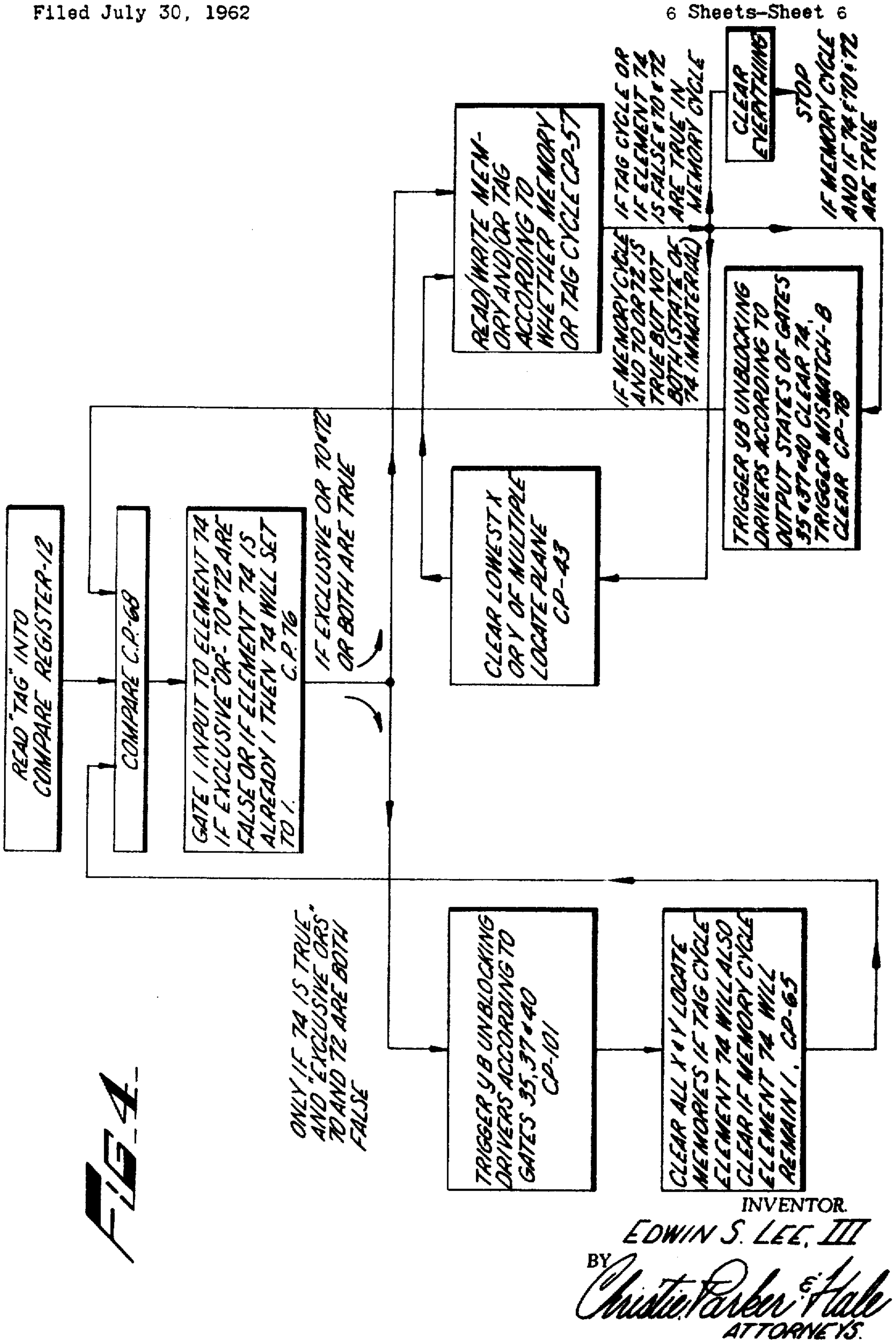

FIGS. 3A and 3B taken together are a block-schematic diagram of a portion of a three dimensional direct access memory embodying the invention; and FIG. 4 is a chart of the operational sequence of the memory of FIG. 3.

The present invention will be described as it may be utilized with a direct access memory of the type disclosed in the above-idenitified Minnick application which is termed a tag memory, and which application is incorporated herein by reference. It should be noted at the outset, however, that the concept of the present invention is not restricted to use with the tag memory of said application but may be utilized with any type of direct access memory or storage devices wherein a plurality of locations may respond to an input signal.

Figures 1, 1A:
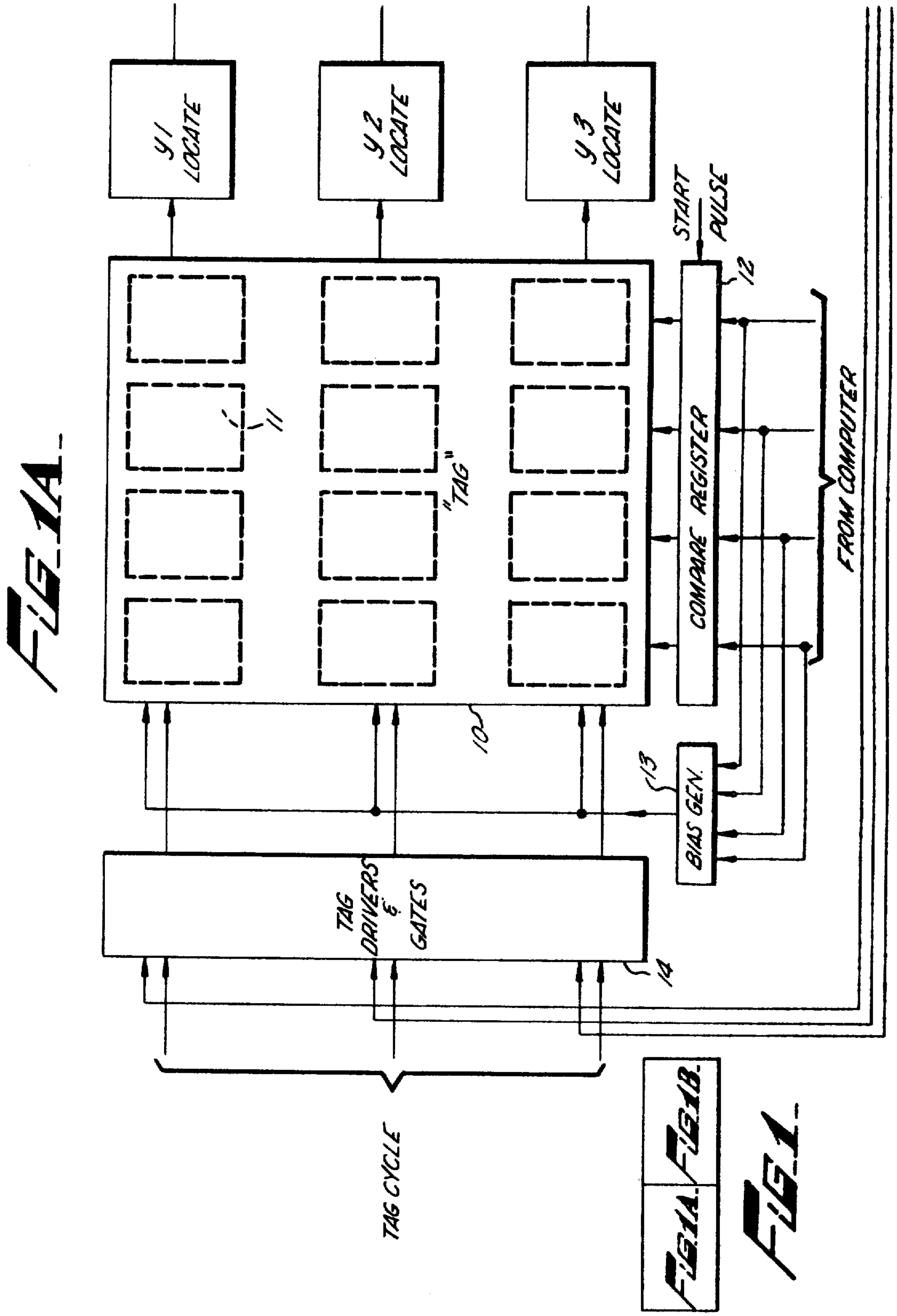
Figure 1B:
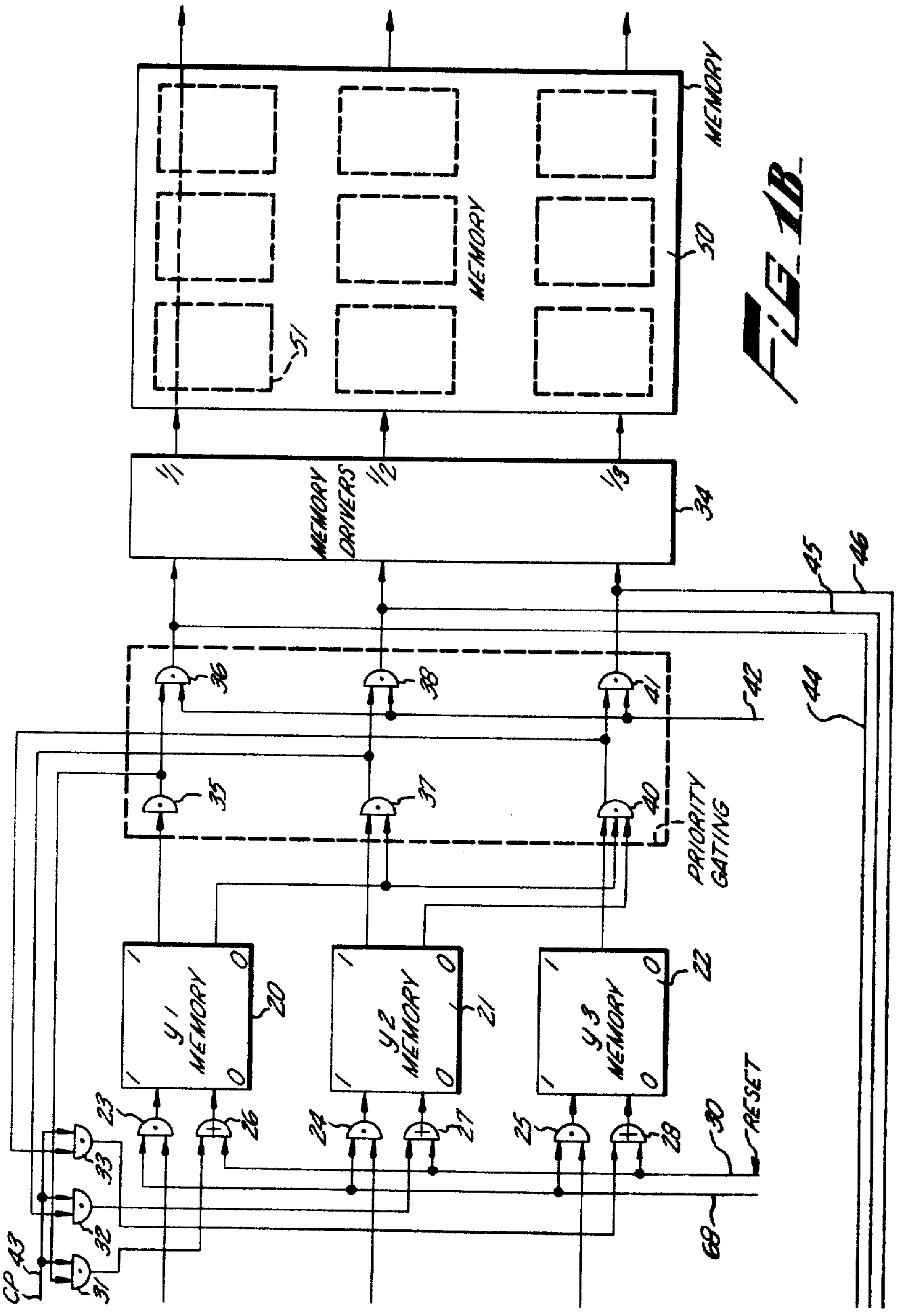

The invention will be first described as embodied in a two dimensional memory system. The arrangement of FIG. 1 is in accordance with the memory arrangement described in the above-identified Minnick application. Briefly, the memory comprises two portions—a tag or word identification memory portion and a word storage portion or the memory proper. In accordance with the teachings of this Minnick application, the location or the presence of a word in memory is determined by applying the tag associated with that word simultaneously to all the "tags" in the tag portion of the memory and, if the tag is present, a locating signal will be generated which is effective to read out the associated word from the memory portion. In the event that multiple matches are detected in the tag portion, it is necessary to resolve the multiple matches before the sequence of operation of the memory may properly go forward on a single one of these matching tags and, furthermore, to operate on only the corresponding coordinates that represent a valid match.

The description and the structure shown in FIG. 1 is then limited to the necessary explanation for resolving these multiple matches and a more detailed description of the basic tag memory may be had by reference to said Minnick application.

Referring to FIG. 1 in particular, it will be noted that a plane of tag or associative cells is identified by the reference numeral 10. For the purposes of explanation, the tag plane 10 is shown with a plurality of tag cells arranged in rows and columns and each cell is shown in dotted outline as represented by the outline 11, for example. It will be recognized that each of the cells 11 may be a transfluxor arranged in accordance with the Minnick application. The tag plane 10 is further shown with three rows of tag elements 11 arranged in four columns wherein each row of tag elements 11 represents a separate tag or word identification portion. The tag plane 10 and its associated tag elements 11 is arranged with a compare register 12 which receives the tag or word identification portion from the computer proper and applies it to the tag plane 10 wherein the corresponding bits of the tag are applied in a columnar fashion to the corresponding bits in the tag memory elements 11 whereby all of the tags may be simultaneously compared. In addition, the bias generator 13 is coupled to receive the input signals from the computer proper and produces an output signal therefrom that is coupled in combination with the signals read out from each of the tag elements 11 in order to effect the necessary simultaneous comparison and produce the unique locating signal corresponding to a matching tag. The tag drivers and gating circuits therefor are generally shown in block form and are represented by the reference numeral 14, the tag drivers being controlled to drive the corresponding rows of tag elements 11 in accordance with the output indications from the locating circuits, as will be described more fully hereinafter. It will be recognized that the tag drivers and gates 14 are also controlled by the cycle control element represented as the cycle control element 50 in the aforementioned Minnick application to control whether the memory goes through the tag or the memory cycle. Accordingly, the excitation of the tag drivers and gates 14 is also controlled by a signal from the tag output of the cycle element 50, as described in the same Minnick application. The sensing windings for each row of tag elements 11 are coupled to a separate locating circuit which conventionally may be a threshold detector for detecting the unique output signal that represents a matching tag. These locating circuits are represented in block form and are identified as the $Y_1$, $Y_2$, and $Y_3$ locate circuits. It should be understood that an output signal is produced from these locate circuits only when a signal indicative of a matching tag is received from the sensing windings of the row with which it is associated.

Each of the $Y_1$, $Y_2$, and $Y_3$ locate circuits are provided with a storage device for storing the matching output signals from the locating circuits. To this end, the storage elements are shown in block form as conventional bistable circuits or flip-flops and are further identified by the reference numerals 20, 21, and 22. Each of the input circuits, shown as the 1 and 0 input circuits, for these memory elements 20, 21, and 22 are provided with separate control gates for controlling the storage and erasure of the locate signal to be stored therein. To this end, each of the 1 input circuits to the storage elements are controlled by an AND circuit 23, 24, and 25, respectively, while each of the 0 input circuits are controlled by an OR circuit identified by the reference numerals 26, 27, and 28, respectively.

The AND circuit 23 for the memory element 20 is a two input AND circuit and is coupled to receive the matching output indication from the $Y_1$ locate circuit along with a storage control pulse or a clock pulse identified by the reference numeral 68. This clock pulse is identified in the same fashion as it is in the aforementioned co-pending application for controlling the $Y_1$, $Y_2$, and $Y_3$ locate circuits. In the same fashion the AND circuits 24 and 25 are coupled to this same clock pulse and are individually coupled to their $Y_2$ and $Y_3$ locate circuits respectively.

The OR circuits 26, 27, and 28 for the memory elements 20, 21, and 22 are each coupled to an erasing or reset pulse which appears on the line 30. The OR circuit 26 is further coupled to be responsive to the output signal from an AND gate 31, while the OR circuits 27 and 28 are individually coupled to be responsive to the output indication from the AND gates 32 and 33 respectively. The output circuits from these memory elements 20, 21, and 22 are also coupled to a control gating arrangement coupled between the memory elements and the memory drivers shown in block form and represented by the reference numeral 34. The 1 output circuit for the memory element 20 is coupled to a single input AND circuit 35. The AND circuit 35 may be omitted but is described to shown a symmetrical relationship only. The output signal of this AND circuit 35 is coupled as one of the input signals to an AND circuit 36, which, in turn, has its output coupled to the memory driver 34. Additionally, the output signal from the AND circuit 35 is coupled directly to the AND circuit 31. The 0 output circuit from the memory element 20 is coupled to a two-input AND circuit 37 in combination with the 1 output circuit for the memory element 21. The output signal from the AND circuit 37 is coupled directly to an AND circuit 38 and which AND circuit has its output signal coupled directly to the memory drivers 34. The output circuit of the AND circuit 37 is also coupled directly to the input circuit of the AND gate 32. The 0 output circuit for the memory element 21 is coupled to an AND circuit 40 and which AND circuit also receives the output signals from the 0 output circuits of the memory elements 20 and 21. The output circuit of the AND gate 40 is connected to an AND circuit 41 which, in turn, has its output circuit connected to the memory drivers 34. The output circuit of the AND circuit 40 is also coupled to the input of the AND circuit 33. Each of the AND circuits 36, 38, and 41 are coupled in parallel circuit relationship with the clock pulse 42. To the same end, each of the AND circuits 31, 32, and 33 are coupled to be controlled by clock pulse 43. As mentioned hereinabove, the tag drivers and gates 14 are controlled by the locating signals generated, and, to this end, each of the output circuits for the AND gates 36, 38, and 41 are connected by the lead wires 44, 45, and 46 respectively to the tag drivers and gates 14.

The memory drivers 34 are coupled to a memory plane 50. The memory plane 50 is a conventional memory and comprises a plurality of memory elements 51 arranged in rows and columns and are responsive to the memory drivers 34 for producing an output indication representative of the word associated with the matching tag upon excitation of the memory driver for a particular memory row.

With the above apparatus in mind, the operation of the memory for resolving multiple matches will be described. As is described in the aforementioned application, the direct access memory basically has two cycles identified as the tag cycle and the memory cycle. In following the tag cycle, a matching tag is located and then both the matching tag and its associated word are erased from the memory and then a new tag and its associated word is written in its place. In the memory cycle after a matching tag is located, the physical location in the memory proper corresponding to the matching tag is operated on. To this end, the word is read out of memory or a word is written into this memory location.

It will first be assumed that the memory cycle element 50 has been set into the tag cycle and multiple matches have been detected whereby each of the Y coordinates, $Y_1$, $Y_2$, and $Y_3$ are excited. With multiple matches detected by the $Y_1$, $Y_2$, and $Y_3$ locate circuits and with the arrival of the clock pulse 68 at each of the AND circuits 23, 24, and 25, the corresponding memory elements 20, 21, and 22 will each be set to its 1 state, or "true" state, to store the matching indications corresponding to their locating circuits. Accordingly, each of the 1 output circuits for these memory elements will be in a true state and each of the 0 output circuits will be in a false state. The AND gating circuits 37 and 40 controlled thereby will, then, provide a "false" output signal, while the AND circuit 35 will be true, and their corresponding memory drivers will not be energized and de-energized respectively. At the clock pulse interval at which the clock pulse appears on the line 42, then the memory driver $Y_1$ will only be actuated although multiple matches have been detected. Since the memory has been set into the tag cycle, it is only desired to write into one location in the memory and the next pulse that is effective on the apparatus is the re-set pulse appearing on the line 30. The re-set pulse appearing on line 30 is coupled to each of the OR circuits 26, 27, and 28, and, therefore, is effective to reset the memory elements 20, 21, and 22 to their 0 state. This, then ends the conventional tag cycle.

Assuming, then, that the memory cycle element 50 has been reset to the memory cycle and multiple matches have again been detected in the tag portion of the memory. Assuming that each of the $Y_1$, $Y_2$, and $Y_3$ locate circuits once again have detected to a match at the interval at which clock pulse 68 is effective, each of these matching locations will be stored in the corresponding memory elements 20, 21, and 22. The cycle will continue as described hereinabove and the memory 50 will be read out at the location corresponding to the $Y_1$ locate circuit as a result of the output produced from the AND circuits 35 and 36. Since we are in the memory cycle and we have arbitrarily determined that each of the matching locations will be operated on in the $Y_1$, $Y_2$, $Y_3$ sequence, it will be noted that before the arrival of the re-set pulse 30 the clock pulse 43 is applied to each of the AND circuits 31, 32, and 33. Since these AND gates are coupled between the AND gates 35, 37, and 40 and the 0 input circuits of the memory elements 20, 21, and 22, respectively, only the memory element 20 will be reset to the 0 state as a result of the occurrence of clock pulse 43. It will be recalled that a false output will be derived from the output circuits of the AND gates 37 and 40 and, therefore, the corresponding AND gates 32 and 33 will produce a false output signal to cause the memory elements 21 and 22 to remain in the true state. On the other hand, the true signal produced by the AND gate 35 is effective in combination with the clock pulse 43 to cause a true signal to be derived from the AND gate 31 and the resetting of the memory element 30 by means of the OR circuit 26.

After the clearing of the memory element 20, its 0 output circuit is now in the true state and, therefore, a true output indication will be provided from the AND circuit 37, while during this interval the AND circuits 35 and 40 will produce false output signals. Accordingly, upon the arrival of clock pulse 42 the AND circuit 38 will produce a true output signal to drive its corresponding memory driver and the corresponding memory location in the memory 50 will be operated upon. With the state of the memory elements arranged in this fashion then, with the arrival of the clock pulse 43, once again, at the AND circuits 31, 32, and 33 a true output signal will be produced only from the AND circuit 32 and which AND circuit is effective through the OR circuit 27 to reset the memory element 21 to its 0 state. This, then, causes the 0 output circuit of the memory element 21 to assume a true state and, along with the true state of the 0 output circuit previously assumed by the memory element 20 and the true state of the memory element 22 all of the logical conditions have been met to produce a true output signal from the AND circuit 40. Finally, then, with the arrival of the clock pulse 42, the memory 50 will be acted upon at the location corresponding to the $Y_3$ tag location. As in the tag cycle, the clear pulse 30 is applied to all of the elements of the memory to reset them to the 0 state in anticipation of the next cycle.

It should now be appreciated that the gating arrangement arranged between the memory elements 20, 21, and 22 and the memory drivers 34 function as a priority gating network in which the matching locations as indicated by the memory elements may be selected in any sequence to cause the memory to be operated on in the corresponding memory locations one at a time.

Although the arrangement of FIG. 1 is shown and has been described in terms of a two dimensional memory arrangement, it should be noted that the same sequence of operations applies to a three dimensional memory, as may be appreciated by reference to FIG. 4 and will be explained in more detail hereinafter. To this end, this priority gating is effective to resolve multiple matches in a three dimensional memory in which multiple matches may be represented by a single X or a single Y location with their respective multiple Y's or multiple X's. Under this state of circumstances then, the operation of the three dimensional memory is as described for the memory cycle in two dimensions, the control circuitry memory being duplicated for the X and Y locations. This will be seen to be true since in the two dimensional arrangement illustrated the generation of a locating signal is effective to locate in terms of both an X and Y coordinate the corresponding or associated word in the memory.

Figure 2:
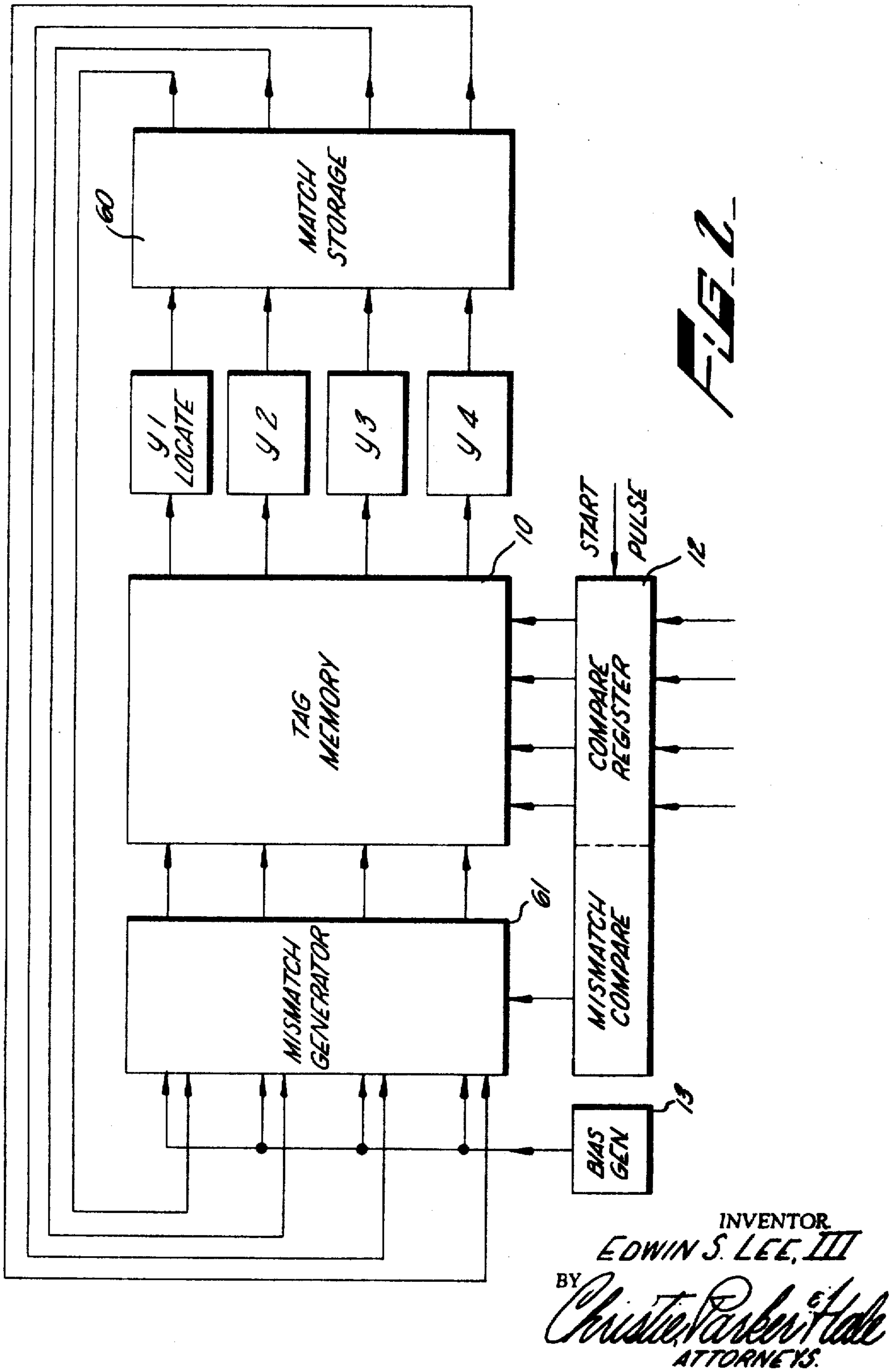
FIG. 2 is a block diagram of an alternative arrangement for resolving multiple matches in a direct access memory.

Now referring to FIG. 2, another arrangement for resolving the multiple matches will be discussed. The arrangement of FIG. 2 is shown in combination with the the tag memory described hereinabove. In general, the embodiment shown in FIG. 2 is applicable to both a two dimensional and a three dimensional memory. The concept embodied in the diagram of FIG. 2 is the generation of a mismatching signal for each location in the memory except one that has been previously determined to have a matching tag and recycling the memory to cause only the selected matching tag to produce a match.

The tag memory is shown in terms of a single plane 10 associated with a compare register 12 and a plurality of $Y_1$, $Y_2$, $Y_3$, and $Y_4$ locate circuits. The storage apparatus for the locating circuits are diagrammatically shown as a single block identified by the reference numeral 60. The output of the storage elements may then be combined in a "logical" fashion and which logical control circuitry is utilized for controlling a mismatch generator 61. The mismatch generator 61 is coupled to each row in the tag memory in series combination with the signal developed by the bias generator 13. The mismatch generator, for example, may comprise transfluxor circuits that are normally blocked and therefore do not produce an output signal when sensed during a normal comparison operation. The mismatch generator 61 is utilized in combination with a driving source for reading out the transfluxors of the mismatch generator. To this end, the driving source may be incorporated as a portion of the compare register 12 and is excited simultaneously with the compare register whereby it reads out or activates the mismatch generator 61 during each compare cycle.

Accordingly, during a normal compare cycle wherein only a single match is detected all the mismatch generators 61 or all the transfluxors thereof are normally blocked and, therefore, the compare signal applied thereto does not produce an output signal whereby the single match is indicated and stored in the storage apparatus 60. Upon the detection of the multiple matches the logical circuitry associated with the mismatch generator 61 is effective to unblock the mismatch generator for all the tags except one of the matching tags. Accordingly, upon re-initiating the compare cycle the application of the compare pulse to the mismatch generator 61 will cause a mismatch pulse to be applied to the tag memory 10 whereby only a single match will be generated and the corresponding word in memory may be operated.

It should be recognized that the generation of a mismatch signal and the control thereof may take many forms and the use of a transfluxor mismatch generator is merely illustrative of the invention. For example, the bias generator 13 generally employed in the tag memory may be utilized for generating mismatch voltage to all the cores in the tag memory and utilized in combination with a signal of opposite polarity that is applied to a selected one of the matching tags to override the bias signal whereby the selected matching tag will produce a match while all the other tags that previously produced a match will indicate a mismatch. To this same end, when the transfluxors are utilized in the mismatch generator 61, the control signals operated from the match storage 60 may be effective to unblock all the transfluxors for generating a mismatch signal. One of the transfluxors arranged with a tag that previously produced a match may be coupled to an inhibiting current source to cause that particular transfluxor to remain in the blocked state and, therefore, that tag will indicate a match. A more detailed description of the use of a mismatch generator and the structure thereof as applied to a three dimensional memory will immediately follow.

Now referring to FIGS. 3 and 4, an arrangement adaptable to a three dimensional memory employing both the priority gating arrangement of FIG. 1 and a mismatch generating concept of FIG. 2 will be described. The timing sequence of the control pulses for the circuitry of FIG. 3 (as well as FIG. 1) can be most readily determined from the chart of FIG. 4 which shows the different operational sequences and the logical conditions that must prevail in order that a particular decision be made to follow one of the branches. These same logical conditions or states are utilized in a conventional fashion to control a timing source (not shown) for initiating the control or clock pulse shown associated with a particular operation in box form.

The general organization of the three dimensional tag memory shown in FIG. 3 is similar to that shown in FIG. 1 with the addition of the mismatch generator and the control circuitry therefor as required in a three dimensional arrangement. To this end, the tag memory plane 10 is further identified as the $X_1$ plane and it should be recognized that a plurality of similar planes are associated with the tag memory and are stacked in a parallel relationship behind the $X_1$ plane and would be identified as the $X_2$, $X_3$, $X_4$, et cetera planes (not shown). In this arrangement, then, the compare register 12 is coupled to each tag plane in the tag memory. To this end, the output of the compare register 12 is applied to all the tag memory elements in each of the planes to allow all of the tags to be simultaneously compared. As in the three dimensional arrangement shown in the co-pending application, the locating circuits or threshold detectors were utilized with an OR network comprising a plurality of diode gates. Upon the generation of a unique output signal indicative of a matching tag from a particular row in the tag portion of the memory, this output signal is applied to both elements of the OR circuit whereby the two corresponding X and Y coordinate signals are developed. To this end, when the $Y_1$ row for the $X_1$ tag plane is productive of a match, the OR circuit associated with the $Y_1$ row for this plane will produce a $Y_1$ locating signal and an $X_1$ locating signal that is applied to an associated control network similar to the one to be described for the $Y_1$ arrangement.

The control arrangement for the Y locating circuits for the $X_1$ plane will be seen to be the same logical control arrangement and memory elements described in conjunction with FIG. 1. The OR circuits 26, 27, and 28 shown with the memory elements 20, 21, and 22, respectively, have been modified to include a further input lead for the clock signals 65 and 78 appearing thereon as is required for the purposes of the three dimensional arrangement. The output of the memory elements 20, 21, and 22 are then coupled to the memory drivers 34 by means of the priority gating network as previously described. The 1 output circuits for the memory elements 20, 21, and 22, in this instance, are also coupled to an exclusive OR circuit 70. The output circuit of the exclusive OR circuit 70 is coupled to an inverter circuit 71 and the output circuit of the inverter circuit 71 is coupled in parallel circuit relationship to each of the AND gates 31, 32, and 33.

This same control arrangement then is duplicated for each tag memory plane and will be responsive to the locate signals individual to that plane. Specifically, each row of each tag plane will be provided with a locate memory element for storing the indication of the matching coordinate. In the same fashion, each tag plane is provided with a single locate memory element for storing the coordinate of the associated plane, such as the $X_1$ memory element shown. It should be noted that the X memory elements are controlled by the same type of logical input circuits as shown and described for the Y memory elements, including a priority gating arrangement utilizing the output indications of the locate memory elements. These logical circuits are not shown merely to simplify the description and drawings. Assuming for the purposes of the discussion that there are three tag planes, then each tag memory plane will be coupled to a separate X memory element to indicate that a matching tag has been detected in that plane. Accordingly, the outputs of these memory elements will be coupled to a corresponding control network to that described for the Y memory elements to a memory driver as well as having these memory elements coupled to an individual exclusive OR circuit 72 and which exclusive OR circuit is coupled to an inverter circuit 73.

In a three dimensional arrangement it is possible that more than one X and Y location will be produced in response to a comparison operation. Accordingly, a bistable element 74 is utilized to record the generation of multiple X's and multiple Y's by being set to the 1 state. To this end, the 1 input circuit for the bistable element 74 is provided with a three input AND circuit 75 which receives the output signals from the inverters 71 and 73 along with a control pulse 76. To this said end, the 0 input circuit is provided with an OR circuit 77 that is responsive to the clear pulse 30, a clock pulse 78, and the output of the AND circuit 79. The AND circuit 79 is responsive to a clock pulse 65 and a pulse from the cycle element from the memory proper indicative of a tag cycle. The 1 and 0 output circuits for the element 74 are applied to the clock pulse generator to control the sequencing of the clock pulses in accordance with the operational sequence shown in FIG. 4 as mentioned hereinabove.

The output signals from the AND gates 35, 37, and 40 are coupled to a control network for controlling the energization of the mismatch generator 61 arranged with each row in the associated tag memory planes. The mismatch generator 61, then, comprises an additional memory plane having a mismatch generator for each row of each tag plane and may be considered to be an extension of the tag memory planes. The mismatch generator 61 is utilized with only one set of coordinates and is shown associated with the Y coordinate. In the event of multiple X's and Y's, then, the resolution is effected by the use of the mismatch generator to provide a single Y matching signal and utilizing the priority gating for the X coordinates for discriminating between the multiple X's.

The mismatch generator 61 is shown as comprising two transfluxors arranged in separate columns for each row of a single memory plane. The left hand column of transfluxors is further shown as within the dotted outline identified by the reference letter A, while the right hand column of transfluxors is identified by the reference letter B. As is well known in the art, the transfluxors may be blocked and unblocked by the application of a signal to the winding coupled to the large aperture of the transfluxors. In the diagrammatic representation of the transfluxor the bottom loop shown is representative of the large aperture of the transfluxor while the smaller loop is representative of the smaller aperture of the transfluxor. To this end, it will be noted that an unblocking winding is coupled to each of the larger apertures for the transfluxors in columns A and B. The transfluxor, then, corresponding to the $Y_1$ row and arranged in column A is coupled to an unblocking source shown as the block $Y_{1A}$ unblock and which block is responsive to the output signal from a two input AND circuit 85. One of the input circuits to the AND circuit 85 is coupled by means of the lead wire 86 to the output of the AND gate 35. It will be recalled that the AND gate 35 is utilized with the memory element 20 for hte $Y_1$ locate detector. This same signal appearing on the lead wire 86 is coupled to an inverter circuit 87 and the inverter circuit is coupled to the input of an AND gate 88. The output of the AND gate 88 is coupled to the unblocking source $Y_{1B}$ that corresponds to the $Y_1$ transfluxor arranged in column B for the mismatch generator 61. In this same fashion each of the transfluxors corresponding to the locations $Y_2$ and $Y_3$ arranged in the columns A and B are coupled to individual unblocking sources that are similarly identified and controlled. To this end, the unblocking sources $Y_{2A}$ and $Y_{2B}$ are controlled froa signal derived from the AND circuit 37 and appearing on the lead wire 90. This signal is coupled in parallel circuit relationship to an inverter 91 and an AND circuit 92. The output of the AND circuit 92 is coupled directly to the $Y_{2A}$ unblock circuit. The output of the inverter 91 is coupled to an AND circuit 93. The output of the AND circuit 93 is coupled to the $Y_{2B}$ unblock circuit. In the same fashion, the signal derived from the AND circuit 40 appearing on the lead wire 94 is coupled to an inverter circuit 95 and an AND circuit 96. The output of the AND circuit 96 is coupled directly to the $Y_{3A}$ unblock source while the output of the inverter 95 is coupled to an AND circuit 97. The output of the AND circuit 97 is coupled to the $Y_{3B}$ unblock source. The input circuits to the AND gates 85, 92, and 96 are completed by each being coupled to the clock pulse 78, while the input circuits for the AND gates 88, 93, and 97 are each coupled to a clock pulse 101.

To read out the transfluxors in the mismatch generator 61 a pair of read-out elements that may be coupled to or incorporated with the compare register 12 are individually coupled to the columns A and B and, in particular, are coupled through the smaller apertures of the transfluxors as shown. The compare elements A and B are actuated from the compare register 12 with each initiation of the compare cycle and it will be noted that since the transfluxors are all normally blocked they will not produce an output signal in response to a normal comparison cycle. When a particular transfluxor is unblocked, then, in response to the control arrangement described hereinabove, the signal read out from the mismatch compare elements A and B is effective to produce an output signal on the read-out windings for the unblocked transfluxors that is combined with the signal generated by the bias generator 13 to produce a mismatch signal at all rows where previously a match was indicated.

To this same end, the column of transfluxors A and B is provided with a blocking source individually coupled to the columns A and B and particularly through the larger apertures of these transfluxors. The block source A for the mismatch generator 61 is controlled by means of the clear pulse 30 while the block source B is controlled through an OR gate 103 having a pair of clock pulses applied thereto. The clock pulses are respectively identified by the reference numerals 78 and 30.

With the above structure in mind, the operation of a three dimensional arrangement will now be described. After the start pulse is applied to the compare register 12, the memory cycles will proceed in accordance with whether a single or multiple match is detected. It will be appreciated that if a single match is detected the memory will cycle in accordance with the procedure described in the aforementioned co-pending application and this operation will not be considered. Assuming, then, that multiple matches are detected and stored in the locate memory elements and further assuming that the multiple matching locations comprise a single X and multiple Y locations or a single Y and multiple X's. Since the cycle of operation of the memory is the same for either one of these conditions, the operation will proceed for a single X and multiple Y.

After the comparison operation has taken place the clock pulse 68 will be provided from the clock pulse generator and will cause the multiple Y locations to be stored in the correct memory elements 20, 21, or 22. At this point it is convenient to refer to the chart of FIG. 4 and consider the logical conditions of the bi-stable element 74 and its associated exclusive OR circuits 70 and 72. Since there are multiple Y coordinates, more than one of the input circuits to the exclusive OR circuit 70 is true and, therefore, the output state thereof is false. This false output condition is inverted by the inverter 71 to produce a true signal at the AND gate 75. Examining the exclusive OR circuit 72, it will be seen that since a single X coordinate has been detected the output of this circuit will be true and, when inverted by the inverter 73, will produce a false signal to the AND gate 75. Accordingly, upon the arrival of clock pulse 76 a false output will be produced from the AND circuit 75 and, therefore, the bi-stable element 74 will not be set to 1 but will be retained in its 0 state. This is the correct state for the element 74, it will be recalled, since this element is utilized to store the fact that multiple X's and Y's have been detected.

With these logical conditions in mind and referring to FIG. 4, it will be noted that after the arrival of clock pulse 76 that a decision has to be made in accordance with the logical states of the bi-stable element 74 and the exclusive OR circuits 70 and 72. It will be noted that since the exclusive OR circuit 72 is true, the cycle of operation will proceed in accordance with the right hand portion of the cycle shown in FIG. 4. Accordingly, the memory will proceed through a memory or tag cycle in accordance with the state of the memory cycle element 50. If it is assumed for the present that a tag cycle is indicated, then the next clock pulse to be generated will be the clock pluse 57 and the memory will cycle through the normal tag cycle for one cycle and then the clear pulse 30 will be generated in which all of the memory elements will be cleared and the tag cycle of operation will end thereafter.

If under the above logical conditions, the memory cycle element 50 is set into the memory cycle, then after the occurrence of a clock pulse 57, a branching operation will take place and will follow the left-hand route after the occurrence of the clock pulse 57. It will be noted that this route is followed if the memory cycle is set and the exclusive OR circuit 70 or 72 is true but not if both are true. Furthermore, the state of the bi-stable element 74 is not material to control this branching operation. It will be noted that this branch will be followed since the exclusive OR circuit 72 is true while the exclusive OR circuit 70 is false. Following this branch, then, the clock pulse 43 will be the next one to be generated and thus will clear the lowest Y memory element, but not the single X memory element due to the true state of exclusive OR circuit 72, and then the cycle will continue by means of the clock pulse 57 to allow the location corresponding to the next lowest Y coordinate along with the single X coordinate to be operated on. This cycle continues as described hereinabove until a single one of the Y memory elements remains in the true state. Under these logical conditions, then, both the exclusive OR circuits 70 and 72 are in the true state and, therefore, a different branching operation occurs. Considering that the bi-stable element 74 is set in the 0 state and the exclusive OR circuits 70 and 72 are both true, then the next pulse to occur is the clock pulse 30 which clears all of the memory elements, after which interval the memory cycle stops.

Assuming now that after a compare cycle has taken place that multiple matches are detected which correspond to locations having multiple X and multiple Y locations in the memory proper. Under these logical conditions, then, both the exclusive OR circuits 70 and 72 are false and, accordingly, the outputs from the inverters 71 and 73 provide true signals at the AND gate 75. Accordingly, upon the arrival of clock pulse 76 at the AND circuit 75 the bi-stable element 74 is set into the 1 state. Examining FIG. 4 once again, it will be noted that these logical conditions correspond to the recited logical conditions for following the left hand branch of the operational sequence after the occurrence of clock pulse 76. With this logical state prevailing then, it will be noted from FIG. 4 that the next clock pulse to be generated is the clock pulse 101. The clock pulse 101 is applied to each of the AND gates 88, 93, and 97 which, in turn, are dependent upon the state of the signals from the AND gates 35, 37, and 40. With multiple Y's, then, the only true signal derived from these latter AND gates is the signal derived from the AND gate 35. Accordingly, the signal applied to the AND gate 88, based on this signal, is a false signal in view of the provision of the inverter circuit 87 arragned between the AND gate 35 and the AND gate 88. At clock pulse time 101, then, the $Y_{1B}$ unblocking source will remain unexcited. With the false signal derived from the AND gates 37 and 40, it will be seen that these pulse signals in turn will each be inverted by the inverters 91 and 95 whereby true signals are applied to the AND gates 93 and 97 and at clock pulse time 101, the true signals derived from these AND circuits are effective to excite the unblocking sources for unblocking the $Y_{2B}$ and $Y_{3B}$ transfluxors. It will be noted, then, that all of the transfluxors have been unblocked in the B column of the mismatch generator 61 except the transfluxor arranged in the $Y_1$ row. The $Y_1$ row, of course, is representative of the lowest numbered Y location that is representative of a matching location.

Following the memory cycle, then, it will be noted that the next clock pulse to be generated will be the clock pulse 65. The clock pulse 65 is applied to the X and Y locate memory elements, such as the elements 20, 21, or 22 through their respective input OR circuits to clear them or reset them to their 0 state. It will be noted at this point that if a tag cycle has been set into the memory element 50 that the bi-stable element 74 will also be cleared since the clock pulse 65 is also applied to the AND circuit 79 and the combination of the clock pulse with the tag cycle signal will produce a true output from the AND gate and, therefore, a true output from the OR circuit 77 to reset element 74.

After all the necessary circuit elements have been cleared, the compare cycle one again is initiated. Under these circuit conditions, then, the multiple Y locations have been reduced to a single Y coordinate due to the excitation of the mismatch generator 61, and, accordingly, the exclusive OR circuit 70 produces a true output while the multiple X's produce a false output from the exclusive OR circuit 72. Under this state of logical conditions, then, the right hand branch of FIG. 4 is once again followed and a single memory operation will occur if the tag cycle has been indicated and if the memory cycle is indicated then the left hand portion of this left hand branch will be followed whereby the lowest X location will be operated on with the single Y location by means of the X coordinate priority gating and the cycle repeated until each of the X locations have been operated on. After following this sequence to the point where only a single X and a single Y are stored in the corresponding X and Y locate memory elements and, after the clock pulse 57 has occurred, it is necessary to once again examine the logical states of the exclusive OR circuits 70 and 72 and bi-stable element 74. To this end, it will be recalled that the bi-stable element 74 had previously been set to the 1 state for remembering that multiple X's and Y's were originally detected, and during the memory cycle has remained in this 1 state. Accordingly, it will be noted that all of the logical conditions for generating the clock pulse 78 will have been satisfied since the memory has been set into the memory cycle, the bi-stable element 74 is in the 1 state, and both the exclusive OR circuits 70 and 72 are in the true state.

The generation of clock pulse 78, then, is effective to once again block all of the transfluxors in column B of the mismatch generator 61. This occurs since the clock pulse 78 is applied to the OR circuit 103 to energize the blocking source B. At this same time the bi-stable element 74 is reset to the 0 state since the clock pulse 78 is also applied to the OR circuit 77 for producing a true output signal. The clock pulse 78 is also applied to the AND gates 85, 92, and 96. It will be recalled that these AND gates are dependent upon the output state of the signals from the AND circuits 35, 37, and 40. Accordingly, since only a single Y location has been indicated and assuming this is the $Y_1$ location, it will be noted that a true output signal will occur only from the AND gate 35. The only true output from these AND circuits is from the AND gate 35 and which signal is effective to excite the unblocking source for unblocking the transfluxor in the $Y_{1A}$ location. It will be recalled that this $Y_1$ row in the tag memory was the one row that was not unblocked previously. In addition, the application of the blocking current from the blocking source B is not effective on column A and, accordingly, the $Y_1$ row mismatch generator is now in condition to generate a mismatch signal on this row. Furthermore, assuming that a transfluxor element is utilized in the mismatch compare for column B of the mismatch generator 61, the clock pulse 78 is also effective to reset this element.

After all these elements have been cleared, then, the compare cycle is once again initiated. The compare cycle will result in either the production of a single or multiple matches in accordance with the information stored in the memory at each location except the $Y_1$ locate position. Therefore, the cycle will continue in accordance with whether the single or multiple Y's are located. If a single Y is located, then the cycle continues as described hereinabove wherein by means of the priority gating circuits the single Y is utilized with the multiple X locations. If multiple Y's are detected, then the cycle branches to the left hand branch of FIG. 4 and the sequence will be the same as described hereinabove wherein a single Y is selected, assuming $Y_2$, and then the $Y_2$ locate position is utilized with the multiple X's in accordance with the priority gating. This cycle then will continue until a single Y has been resolved, in which case the right hand branch of the operational sequence will be followed and recycle until the memory is cleared for the next memory operation.

What is claimed is:

1. Apparatus comprising a plurality of memory cells for storing binary coded information and arranged in a preselected pattern of information groups, means for substantially simultaneously applying binary coded input information to each information group for determining the presence and/or location of the input information by the generation of output signals from each memory cell whereby a composite output signal for each information group indicates the presence or absence of the input information by a respective matching or mismatching signal, and control means coupled to be responsive to a plurality of matching responses for resolving the multiple matches.

2. Apparatus comprising a plurality of memory cells for storing binary coded information and arranged in a preselected pattern of information groups, means for substantially simultaneously applying binary coded input information to each information group for determining the presence and/or location of the input information by the generation of output signals from each memory cell whereby a composite output signal for each information group indicates the presence or absence of the input information by a respective matching or mismatching signal, means for storing each of the matching signals, and control means coupled to be responsive to the storage means for resolving any multiple matches.

3. Apparatus comprising a plurality of memory cells for storing binary coded information and arranged in a preselected pattern of information groups, means for substantially simultaneously applying binary coded input information to each information group for determining the presence and/or location of the input information by the generation of output signals from each memory cell whereby a composite output signal for each information group indicates the presence or absence of the input information by a respective matching or mismatching signal, means for storing each of the matching signals, priority gating means coupled to be responsive to the storing means for controlling the plurality of matching signals in a preselected sequence, and control means coupled to be responsive to the gating means for operating on the memory cells in accordance with the sequence dictated by the priority gating means.

4. A memory comprising a plurality of memory planes each having a plurality of memory cells for storing binary coded information and arranged in rows and columns, a portion of each memory plane comprising an individual word identification storage portion for an associated stored word, means for substantially simultaneously applying binary coded information representative of word identification information to each column of memory cells in each word identification storage portion of each plane for determining the presence and/or location of the associated word by the generation of a unique output signal indicating the presence of the word in the memory, threshold means coupled to each row of each memory plane to be responsive to the unique output signal and for providing a pair of signals representative of the coordinates of the matching word in the memory, means for storing each of the coordinate signals, and control means coupled to be responsive to the output indications from said storage means for operating on the matching words in a preselected sequence.

5. A memory comprising a plurality of memory planes each having a plurality of memory cells for storing binary coded information and arranged in rows and columns, a portion of each memory plane comprising an individual word identification storage portion for an associated stored word, means for substantially simultaneously applying binary coded information representative of word identification information to each column of memory cells in each word identification storage portion of each plane for determining the presence and/or location of the associated word by the generation of a unique output signal indicating the presence of the word in the memory, threshold means coupled to each row of each memory plane to be responsive to the unique output signal and for providing a pair of signals representative of the coordinates of the matching word in the memory, means for storing each of the coordinate signals, individual priority gating means coupled to be responsive to the output signals from each of said storage means for each coordinate to dictate the sequence the multiple locations of the individual coordinate is utilized, normally inoperative mismatch signal generating means coupled to each row for each plane for producing a signal to be combined with the output signal from the individual row to provide a composite output signal indicative of a mismatch or absence of a word in memory including words previously determined to be present, and control means coupled to be responsive to the output signals from one of said priority gating means for rendering the mismatch signal generating means operative for each of the matching locations except one in accordance with the sequence dictated by the individual priority gating means, said control means including means for resetting said storage means and re-applying the binary coded word identification information to said memory planes.

6. A memory as defined in claim 5 wherein said control means includes a memory element for storing a signal representative of multiple locations in all coordinates and for controlling the sequence of memory operations.

7. Apparatus comprising a plurality of memory cells for storing binary coded information and arranged in a preselected pattern of information groups, means for substantially simultaneously applying binary coded input information to each information group for determining the presence and/or location of the input information by the generation of output signals from each memory cell whereby a composite output signal for each information group indicates the presence or absence of the input information by a respective matching or mismatching signal, and mismatch signal generating means coupled to each information group for selective application to each group to resolve multiple matching responses.

8. Apparatus comprising a plurality of memory cells arranged in a preselected pattern of information groups for storing binary coded words, interrogating circuit means for substantially simultaneously applying binary coded information to be compared to each information group with the information previously stored with the corresponding binary characters of the information being compared being applied to the corresponding cell of an information group for sensing the binary character stored in each cell for generating output signals in accordance with the relative binary values of the information undergoing comparison and the stored information whereby a composite output signal for each information group produces a unique output signal indicative of matching information only when the information undergoing comparison is stored in an information group, mismatch signal generating means coupled to each information group for providing a mismatching signal for combination with the composite output signal for each information group whereby each information group will produce a mismatching output signal, and means for selectively energizing said mismatch signal generating means in combination with said interrogating means to provide a mismatch signal to each information group except one.

9. Memory apparatus comprising a plurality of memory cells arranged in a preselected pattern of information groups for storing binary coded words, mismatch signal generating means having individual generating means conditioned to be normally inoperative and selectively operable to momentarily produce an output signal upon being interrogated proportioned to cause a mismatch output signal from the associated information group when combined with the output signal therefrom, interrogating circuit means for substantially simultaneously applying binary coded information to be compared to each information group with the information being compared being applied to the corresponding cell of an information group for sensing the binary character stored in each cell for generating output signals in accordance with the relative binary values of the information undergoing comparison and the stored information whereby a composite output signal for each information group produces a unique output signal indicative of matching information only when the information undergoing comparison is stored in an information group, said interrogating circuit means including means for interrogating the individual mismatch generating means for producing an output signal from each of the generating means conditioned to be operative, means for producing signals corresponding to the coordinates of each of the matching information groups, means for storing each of the coordinate signals, individual priority gating means connected to be responsive to all the storage means for each coordinate, and control means connected to be responsive to the priority gating means for conditioning the mismatching generating means to be operative in accordance with the state of the priority gating means for resolving the multiple matches.

References Cited

UNITED STATES PATENTS

| | | | |
|---|---|---|---|
| 3,199,082 | 8/1965 | Haibt | 340—172.5 |
| 3,191,156 | 6/1965 | Roth | 340—172.5 |
| 3,195,109 | 7/1965 | Behnke | 340—172.5 |
| 2,973,508 | 2/1961 | Chadurjian | 340—172.5 |
| 3,221,158 | 11/1965 | Roth et al. | 235—164 |
| 3,241,123 | 3/1966 | Boucheron | 340—172.5 |
| 3,245,052 | 4/1966 | Lewin | 340—173 |

OTHER REFERENCES

Kiseda et al., A Magnetic Associative Memory, IBM Journal, April 1961. Pages 106–121 relied on.

ROBERT C. BAILEY, *Primary Examiner.*

I. S. KAVRUKOV, *Assistant Examiner.*